2,697,093
Patented Dec. 14, 1954

2,697,093
PROCESS FOR PRODUCTION OF ALKALI METAL POLYSACCHARIDE SULFATES

Rufus Vernon Jones, Bartlesville, Okla., assignor to Phillips Petroleum Company, a corporation of Delaware No Drawing. Application December 16, 1949, Serial No. 133,467

27 Claims. (Cl. 260—215)

This invention relates to a method for the production of cellulose, inulin, starch or dextrin sulfates.

These compounds, in varying degrees of substitution, have found numerous applications in industry as in thickeners for paste, adhesives, and additives for muds used in drilling oil wells.

Heretofore, similar compounds, particularly cellulose sulfate, have been prepared by treatment of cellulose, for example, with sulfuric acid or chlorosulfonic acid, the resulting product being subsequently neutralized with a base, such as sodium hydroxide. Many difficulties are encountered in the commercial operation of such processes due to degradation of the cellulose by the acid treating agent which results in a product of reduced molecular weight, which is undesirable in certain applications of these compounds. Furthermore, in the neutralization of the compound by a base, inorganic salts are formed which are very difficult to remove.

I have discovered a method for producing cellulose, inulin, starch, or dextrin sulfates wherein the aforementioned difficulties are substantially or wholly eliminated, and numerous advantages are realized. In accordance with my invention, cellulose, inulin, starch, or dextrin is treated with a selected sulfating agent in a manner such that degradation of the compound by acidic materials is avoided and, as will hereinafter be explained, contamination of the product by inorganic salts is substantially eliminated. The sulfating agents of my invention are complexes of pyridine, dioxane, N,N-dimethylaniline or B,B'-dichlorodiethyl ether with sulfur trioxide, these complexes being recognized in the art as definite compounds, although their exact molecular structure has not been precisely established. Other complexes of sulfur trioxide with organic radicals may be used as the sulfating agent without departing from the spirit and scope of the invention. The sulfating reaction is carried out in a solvent consisting of pyridine or other tertiary amine, this solvent having the property of forming complexes or compounds with any acidic substances which might form in the reaction zone. Other suitable tertiary amines are alkyl pyridines, such as picolines, N,N-dimethylaniline, and quinolines.

It will be understood, of course, that pyridine, when used as a solvent, is a separate compound from the pyridine-sulfur trioxide complex utilized as a sulfating agent in a preferred embodiment of the invention.

Either during the sulfating operation or subsequent thereto, the product is contacted with metal ions, preferably alkali metal ions, supplied by an ion-yielding material. The ion-yielding materials of my invention are defined as water or solvent soluble, metal compounds which yield metal ions, particularly the alkali metal compounds, such as sodium chloride, sodium bromide, sodium hydroxide, and their potassium analogues. Other representative ion-yielding materials are calcium and magnesium chloride, magnesium sulfate, ferric chloride, sodium oxalate, copper acetate, and silver nitrate. The ion-yielding material may be included in the charge to the sulfating reaction, may be added during the sulfating reaction, or to the reaction product either before or after the washing step.

While the mechanism of the reaction has not been precisely established, to the best of my knowledge, the overall reaction is represented by the following equation:

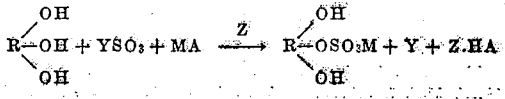

where R represents the nucleus of cellulose, inulin, starch, or dextrin; Y represents the organic part of the sulfating agent, that is, pyridine, dioxane, N,N-dimethylaniline, or B,B'-dichlorodiethyl ether; M represents a metal ion, A represents the anion associated with M, and Z represents a tertiary amine, such as pyridine. It will be understood that more than one hydroxide group may be substituted in the manner shown, and that many groups in the cellulose, inulin, starch, or dextrin molecule may not be substituted at all.

In the sulfating step, an intermediate compound is formed between the cellulose, starch, dextrin, or inulin and the sulfating agent, and this intermediate reacts with the ions from the ion-yielding material. For example, cellulose reacts with pyridine-sulfur trioxide complex as follows:

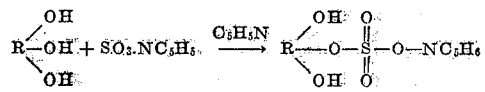

Preferably this reaction is carried out in the presence of pyridine, as shown. This intermediate, when contacted with an ion-yielding material such as sodium chloride, undergoes the following change:

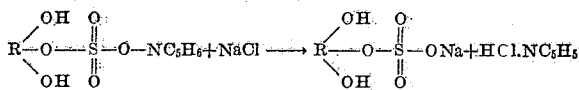

thus yielding sodium cellulose sulfate and pyridine hydrochloride. This reaction takes place during the reaction or later in any suitable solvent such as methanol, ethanol, or water. At the end of the reaction the pyridine complex is converted to pyridine and can be used as a solvent in subsequently carrying out the invention. Accordingly, it will be apparent that the pyridine-sulfur trioxide complex is a preferred sulfating agent, since the by-product recovery and utilization presents advantageous features over those of other sulfating agents.

When the sulfating agent consists of a complex of dioxane, N,N-dimethylaniline, or B,B'-dichlorodiethyl ether with sulfur trioxide, the reaction proceeds according to the following mechanism:

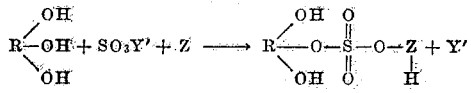

where Y' represents dioxane, N,N-dimethylaniline, or B,B'-dichlorodiethyl ether. The intermediate thus formed will then react with the ion-yielding material as previously shown, either immediately or later, depending on whether the ion-yielding material is present or is added to the system subsequently. Obviously, when the ion-yielding material used is an alkali metal hydroxide such as sodium hydroxide the by-products formed will be water and amine. The reaction with the ion-yielding material may be in the reaction media or conducted in water, ethanol, methanol or any other suitable solvent.

In some instances, and particularly when operating with a small amount of solvent, it may be advantageous to employ a suitable organic diluent such as benzene, cyclohexane, or hexane.

It will be noted, from the above equation, that no inorganic salts are formed by the reaction, the metal ion of the original ion-yielding material combining with the cellulose, inulin, starch or dextrin molecule and the anion being included in the tertiary amine complex, or in water if the anion is the hydroxyl ion, formed in the reaction. Accordingly, no difficulties are encountered in separating large quantities of inorganic salts from the reaction products. Furthermore, acidic degradation of the product is substantially or completely prevented.

In one embodiment of the invention, the material to be treated, the sulfating agent, and the ion-yielding material and solvent are all charged to a reactor in the proportions of 1 to 10 mols of sulfating agent per mol of compound to be treated, 1 to 10 mols of ion-yielding material per mol of compound to be treated, and 10 to 50 mols of solvent per mol of compound to be treated. Preferably, the ion-yielding material is supplied in the proportion of 1 to 3 mols of ion-yielding material per mol of compound to be treated as it is desirable to utilize an amount of ion-yielding material only slightly in excess of the theoretical amount required so that this material is substantially completely utilized in the reaction and little or none of it is left in the reaction products. The ratio of sulfating agent may vary within the aforementioned range in accordance with the degree of substitution desired in the product. After charging the materials to the reactor, a temperature of 40 to 115° C., preferably 70 to 100° C. is maintained and the reactants are stirred for a period of two to fourteen hours. The pressure is not critical and, hence, I prefer to utilize atmospheric pressure although higher or lower pressures may be used without departing from the spirit and scope of the invention. When operating at higher than atmospheric pressures, higher temperatures may be maintained in the reactor. At the end of the reaction period, the mixture is cooled and the product is separated therefrom by filtration or other suitable means, and washed with alcohol, acetone, etc.

In another embodiment of the invention, the material to be treated, the sulfating agent, and the solvent are charged to the reactor in the aforementioned proportions without, however, adding the ion-yielding material. These materials are heated at temperatures within the range previously described for a period of two to six hours with stirring. Thereupon, the ion-yielding material is added and the reaction continued for another period of two to six hours with or without the presence of a solvent, such as water or methanol. At the end of the second reaction period, the product is separated in the manner previously described.

In still another embodiment of the invention, the material to be treated, the sulfating agent, and the solvent are charged to the reactor in the aforementioned manner and maintained under reaction conditions for from two to fourteen hours without the ion-yielding material. The product so formed is separated on a filter and washed after which it is treated with the ion-yielding material. This treatment may be effected with an alcoholic solution of the ion-yielding material, or the intermediate may be dispersed in water and treated with the ion-yielding material after which the sulfate product is precipitated with alcohol.

As a specific example, 64 grams, or 0.40 mol, of pyridine-sulfur trioxide complex were charged to a reactor containing 250 grams, or 3.16 mols, of pyridine. Thereupon 24 grams, or 0.41 mol, of sodium chloride and 16 grams, or 0.10 mol, of commercial cellulose were added. The mixture was heated to and maintained at a temperature of 90° C. with stirring for eight hours. At the end of this period the mixture was cooled, filtered and the product extracted with methanol. The product was light tan in color and, when washed with methanol, became hard and brittle. This material was reduced to fine particles to facilitate the methanol extraction by which chlorides were removed. A yield of 37 grams of sodium cellulose sulfate was obtained. The product contained 14.3 per cent sulfur and has a degree of substitution of 1.3 sulfate groups per glucose unit.

As a second specific example of my process, a run was made wherein 115 grams, or 0.72 mol, of pyridine-sulfur trioxide complex were charged to a reactor containing 250 grams, or 3.16 mols, of pyridine. Thereupon, 16 grams, or 0.1 mol, of commercial cellulose were added and the mixture heated to 90° C. for four hours with stirring. At this time, 30 grams, or 0.51 mol, of sodium chloride were then added and heating was continued for an additional four hour period. At the end of this period, pyridine was decanted from the reactor and the resinous product extracted with methanol. A yield of 66 grams, or approximately 0.17 mol, of cellulose sulfate was obtained upon drying. The product had a sulfur analysis of 18.20 per cent, representing a degree of substitution of 2.1 sulfate groups per glucose unit.

As a third specific example of my process, the reactor was charged with 300 grams, or 3.80 mols, of pyridine; 300 grams, or 3.80 mols, of benzene; 97 grams, or 0.61 mol, of pyridine-sulfur trioxide and 32 grams, or 0.2 mol, of commercial cellulose. The mixture was stirred and heated at 90° C. for eight hours. Heat was discontinued, but the mixture was stirred an additional two hours during cooling. The intermediate product was removed by filtration and washed with 100 grams of benzene. This material was washed by stirring vigorously with methanol and filtering. It was then vigorously stirred with a solution of 30 grams, or 0.75 mol, of sodium hydroxide in methanol. The product was extracted with alcohol to remove excess alkali. After drying in a vacuum over a dessicant, 84 grams of a pinkish, powdery product was obtained. Analysis showed the product to contain 17.35 per cent sulfur and have 1.92 sulfate groups per glucose unit.

As a fourth specific example of my process, 32 grams, or 0.2 mol, of starch was added to 97 grams, or 0.61 mol, of pyridine-sulfotrioxide in 300 grams, or 3.8 mols, of pyridine and 300 grams, or 3.8 mols, of benzene. The mixture was heated and stirred for eight hours at a temperature of 90° C. After three hours, 20 grams, or 0.34 mol, of sodium chloride was added. At the end of the reaction, the resulting products were heated with methanol, granulated, and washed with an additional quantity of methanol until the washings were free of chloride ions. The residue, sodium starch sulfate, was dried in a vacuum and a yield of 68 grams of product was obtained. The product contained 13.61 per cent of sulfur which represented a degree of substitution of 0.66.

As a fifth specific example, one mol of inulin is added to two mols of dioxane-sulfotrioxide in 45 mols of cyclohexane and 45 mols of quinoline. After heating to a temperature of 90° C. for a period of eight hours, two mols of magnesium sulfate is added and the reactants are washed with alcohol. After drying, the resulting magnesium inulin sulfate is removed to storage.

As a sixth specific example, one mol of dextrin and 1.5 mols of N,N-dimethylaniline-sulfotrioxide is charged to a reactor containing 40 mols of n-hexane and 40 mols of picoline. After heating 85° C. for a period of eight hours, 3 mols of copper acetate are added, and the reaction products are washed with water. The resulting copper dextrin sulfate is dried and sent to storage.

While the invention has been described in connection with a present preferred embodiment thereof, it is to be understood that this description is illustrative only and is not intended to limit the invention, the scope of which is defined by the appended claims.

I claim:

1. A process for producing a metal sulfate of a material selected from the group consisting of cellulose, inulin, starch and dextrin which comprises reacting one of cellulose, inulin, starch and dextrin with a metal cation-yielding salt and a sulfating agent consisting of a complex of sulfur trioxide with an organic radical in the presence of a tertiary amine solvent.

2. A process in accordance with claim 1 in which the material to be reacted is starch.

3. A process in accordance with claim 2 in which the metal cation-yielding salt is potassium chloride.

4. A process in accordance with claim 3 in which the solvent is methyl pyridine.

5. A process in accordance with claim 1 in which the material to be treated is cellulose, and the metal ion-yielding material is an ionizable copper compound.

6. A process in accordance with claim 5 in which the organic radical is one of pyridine, dioxane, N,N-dimethylaniline and B,B'-dichlorodiethyl ether and the solvent is pyridine.

7. A process in accordance with claim 1 in which the solvent is pyridine.

8. A process in accordance with claim 7 in which the organic radical is one of pyridine, dioxane, N,N-dimethylaniline and B,B'-dichlorodiethyl ether.

9. A process in accordance with claim 8 in which the metal cation-yielding salt is an alkali metal halide.

10. A process in accordance with claim 9 in which the reactants are in the proportions of 1 to 10 mols of sulfating agent per mol of compound to be treated, said compound being one of cellulose, inulin, starch and dextrin, 1 to 10 mols of metal cation-yielding salt per mol of compound to be treated, and 10 to 50 mols of pyridine per mol of compound to be treated.

11. A process in accordance with claim 10 in which the reaction is carried out at a temperature of 40 to 115° C. for a period of two to fourteen hours with stirring of the reaction mixture.

12. A process for producing an alkali metal sulfate of a material to be treated, said material being one of cellulose, inulin, starch and dextrin which comprises charging said material to a reaction vessel together with a metal cation-yielding salt, a tertiary amine, and a sulfating agent consisting of a complex of sulfur trioxide with one of pyridine, dioxane, N,N-dimethylaniline and B,B'-dichlorodiethyl ether in the proportions of 1 to 10 mols of sulfating agent per mol of said material, 1 to 10 mols of metal cation-yielding salt per mol of said material, and 10 to 50 mols of tertiary amine per mol of said material, maintaining a temperature of 40 to 115° C. for a period of two to fourteen hours, and stirring the reactants as the reaction proceeds.

13. A process in accordance with claim 12 wherein the metal cation-yielding salt is an alkali metal halide.

14. A process in accordance with claim 12 in which the material to be treated is cellulose, the sulfating agent is a complex of sulfur trioxide with pyridine, and the solvent is pyridine.

15. A process in accordance with claim 14 in which 1 to 3 mols of metal cation-yielding salt are utilized per mol of cellulose, and the reaction is carried out at a temperature of 70 to 100° C. at atmospheric pressure.

16. A process in accordance with claim 15 in which the alkali metal compound is sodium chloride.

17. A process for producing a metal sulfate of an organic substance, said substance being selected from the group consisting of cellulose, inulin, starch and dextrin which comprises charging said substance to a reactor with a tertiary amine and a sulfating agent consisting of a complex of sulfur trioxide with a material selected from the group consisting of pyridine, dioxane, N,N-dimethylaniline and B,B'-dichlorodiethyl ether in the proportions of 1 to 10 mols of sulfating agent per mol of said substance and 10 to 50 mols of tertiary amine per mol of said substance, maintaining a temperature of 40 to 115° C. for a period of two to six hours, then reacting the resulting substances in a solvent with a metal cation-yielding salt in the proportions of 1 to 10 mols per mol of said substance, maintaining a temperature within the aforesaid range for an additional period of two to six hours, and recovering a metal sulfate of cellulose, inulin, starch and dextrin from the reactant materials.

18. A process in accordance with claim 17 in which the substance to be treated is cellulose, the sulfating agent is a complex of sulfur trioxide and pyridine, and the tertiary amine is pyridine.

19. A process in accordance with claim 18 in which the metal cation-yielding salt is added in the proportion of 1 to 3 mols per mol of said substance, the temperature is maintained within the range of 70 to 100° C., and the reaction is carried out at atmospheric pressure with stirring.

20. A process in accordance with claim 19 in which the metal cation-yielding salt is sodium chloride.

21. A process according to claim 17 wherein the metal cation-yielding salt is an alkali metal halide.

22. A process for producing a metal salt of a sulfate of a substance selected from the group consisting of cellulose, starch, dextrin and inulin which comprises reacting a tertiary amine salt of one of cellulose, dextrin, inulin and starch sulfate with a metal cation-yielding salt in the presence of a solvent.

23. A process for producing a metal sulfate of a material selected from the group consisting of cellulose, inulin, starch and dextrin which comprises reacting one of cellulose, inulin, starch and dextrin with a metal cation-yielding salt selected from the group consisting of sodium chloride, potassium chloride, calcium chloride, magnesium chloride, magnesium sulfate, ferric chloride, sodium oxalate, copper acetate and silver nitrate, and a sulfating agent consisting of a complex of sulfur trioxide with an organic radical in the presence of a tertiary amine solvent.

24. A process for producing an alkali metal sulfate of a material to be treated, said material being one of cellulose, inulin, starch and dextrin which comprises charging said material to a reaction vessel together with a metal cation-yielding salt selected from the group consisting of sodium chloride, potassium chloride, calcium chloride, magnesium chloride, magnesium sulfate, ferric chloride, sodium oxalate, copper acetate and silver nitrate, a tertiary amine, and a sulfating agent consisting of a complex of sulfur trioxide with one of pyridine, dioxane, N,N-dimethylaniline and B,B'-dichlorodiethyl ether in the proportions of 1 to 10 mols of sulfating agent per mol of said material, 1 to 10 mols of metal cation-yielding salt per mol of said material, and 10 to 50 mols of tertiary amine per mol of said material, maintaining a temperature of 40 to 115° C. for a period of two to fourteen hours, and stirring the reactants as the reaction proceeds.

25. A process for producing a metal sulfate of an organic substance, said substance being selected from the group consisting of cellulose, inulin, starch and dextrin which comprises charging said substance to a reactor with a tertiary amine and a sulfating agent consisting of a complex of sulfur trioxide with a material selected from the group consisting of pyridine, dioxane, N,N-dimethylaniline and B,B'-dichlorodiethyl ether in the proportions of 1 to 10 mols of sulfating agent per mol of said substance and 10 to 50 mols of tertiary amine per mol of said substance, maintaining a temperature of 40 to 115° C. for a period of two to six hours, reacting the resulting substances in a solvent with a metal cation-yielding salt selected from the group consisting of sodium chloride, potassium chloride, calcium chloride, magnesium chloride, magnesium sulfate, ferric chloride, sodium oxalate, copper acetate and silver nitrate, in the proportions of 1 to 10 mols per mol of said substance, maintaining a temperature within the aforesaid range for an additional period of two to six hours, and recovering a metal sulfate of cellulose, inulin, starch and dextrin from the reactant materials.

26. A process for producing a metal salt of a sulfate of a substance from the group consisting of cellulose, starch, dextrin and inulin which comprises reacting a tertiary amine salt of one of cellulose, dextrin, inulin and starch sulfate with a metal cation-yielding salt selected from the group consisting of sodium chloride, potassium chloride, calcium chloride, magnesium chloride, magnesium sulfate, ferric chloride, sodium oxalate, copper acetate and silver nitrate, in the presence of a solvent.

27. A process according to claim 22 in which the metal cation-yielding salt is alkali metal halide.

References Cited in the file of this patent

UNITED STATES PATENTS

| Number | Name | Date |
| --- | --- | --- |
| 1,734,291 | Gebaver-Fuellnegg | Nov. 5, 1929 |
| 1,866,532 | Haskins | July 12, 1932 |
| 2,016,299 | Schulze | Oct. 8, 1935 |
| 2,033,787 | Rigby | Mar. 10, 1936 |
| 2,042,484 | Rubenstein | June 2, 1936 |

FOREIGN PATENTS

| Number | Country | Date |
| --- | --- | --- |
| 493,513 | Great Britain | Oct. 6, 1938 |

OTHER REFERENCES

Ott—Cellulose and Its Derivatives, 1934, pp. 663 to 665.